(12) United States Patent
Dominissini

(10) Patent No.: US 7,025,376 B2
(45) Date of Patent: Apr. 11, 2006

(54) ONE PIECE CUSHION FOR PERSONAL AIRBAG

(75) Inventor: David L. Dominissini, Allen Park, MI (US)

(73) Assignee: Autoliv ASP, Inc., Ogden, UT (US)

( * ) Notice: Subject to any disclaimer, the term of this patent is extended or adjusted under 35 U.S.C. 154(b) by 63 days.

(21) Appl. No.: 10/379,452

(22) Filed: Mar. 4, 2003

(65) Prior Publication Data

US 2004/0174003 A1 Sep. 9, 2004

(51) Int. Cl.
*B60R 21/22* (2006.01)
*B60R 21/24* (2006.01)

(52) U.S. Cl. .................. 280/729; 280/730.1; 280/743.2

(58) Field of Classification Search ................ 280/729, 280/730.1, 732, 743.1, 743.2, 731
See application file for complete search history.

(56) References Cited

U.S. PATENT DOCUMENTS

| | | | |
|---|---|---|---|
| 3,784,225 A | 1/1974 | Fleck et al. | |
| 3,788,663 A | 1/1974 | Weman | |
| 3,843,150 A | 10/1974 | Harada et al. | |
| 3,929,350 A | 12/1975 | Pech | |
| 3,960,386 A | 6/1976 | Wallsten | |
| 3,970,328 A | 7/1976 | Wallsten | |
| 4,076,277 A | 2/1978 | Kuwakado et al. | |
| 5,362,097 A | 11/1994 | Barske | |
| 5,427,410 A | 6/1995 | Shiota et al. | |
| 5,542,695 A | 8/1996 | Hanson | |
| 5,588,672 A | 12/1996 | Karlow et al. | |
| 5,602,734 A * | 2/1997 | Kithil .................. | 280/730.1 |
| 5,618,263 A * | 4/1997 | Alivizatos .................. | 602/6 |
| 5,722,685 A * | 3/1998 | Eyrainer .................. | 280/729 |
| 5,730,464 A * | 3/1998 | Hill .................. | 280/730.2 |
| 5,788,270 A | 8/1998 | Haland et al. | |
| 5,839,139 A * | 11/1998 | Fink .................. | 5/648 |
| 5,899,489 A | 5/1999 | Jost | |
| 6,010,149 A | 1/2000 | Riedel et al. | |
| 6,086,095 A | 7/2000 | Keshavaraj | |

(Continued)

FOREIGN PATENT DOCUMENTS

DE 196 28 837 1/1997

(Continued)

Primary Examiner—Peter C. English
(74) Attorney, Agent, or Firm—Sally J. Brown

(57) ABSTRACT

The present invention relates to an airbag cushion that is lighter-weight, smaller, and more compact than the previously known airbag systems, yet still capable of providing a vehicle occupant with ample impact protection during a crash. Generally, the airbag comprises a one-piece woven cushion with two or more inflatable chambers. These chambers have a generally flat two-dimensional shape in its uninflated and unfolded configuration. However, once gas is added, the airbag cushion rapidly inflates and converts into a three-dimensional shape capable of providing impact protection to the occupant. Preferably, the three-dimensional configuration of the inflated airbag is generally triangular, V-shaped, or polygonal in shape. One of the inflatable chambers functions as an inflatable impact chamber configured such that when an inflation gas in infused into the airbag cushion during a vehicle crash, the inflatable impact chamber inflates and presents a surface to receive the impact of the body of a vehicle occupant. One of the other inflatable chambers is configured to comprise an inflatable support column that is in fluid communication with the inflatable impact chamber. The inflatable support column is constructed such that if inflatable impact chamber begins to compress or deflate under the stress of a crash, the inflatable support column provides a compression-resisting force to the inflatable impact chamber. Additional inflatable support columns may also be added.

44 Claims, 7 Drawing Sheets

U.S. PATENT DOCUMENTS

| | | | |
|---|---|---|---|
| 6,116,644 A * | 9/2000 | Viano et al. .............. 280/743.1 |
| 6,164,696 A * | 12/2000 | Ellerbrok et al. ........... 280/729 |
| 6,247,727 B1 | 6/2001 | Hamada et al. |
| 6,273,465 B1 | 8/2001 | Cress |
| 6,299,202 B1 | 10/2001 | Okada et al. |
| 6,308,983 B1 | 10/2001 | Sinnhuber |
| 6,382,664 B1 | 5/2002 | Hirano et al. |
| 6,398,258 B1 | 6/2002 | Hamada et al. |
| 6,419,262 B1 | 7/2002 | Fendt et al. |
| 6,726,245 B1 * | 4/2004 | Fellhauer et al. ........ 280/743.2 |
| 2002/0024200 A1 | 2/2002 | Eckert et al. |
| 2003/0094794 A1 | 5/2003 | Amamori |

FOREIGN PATENT DOCUMENTS

| | | |
|---|---|---|
| DE | 197 03 945 | 8/1998 |
| GB | 2 289 653 | 11/1995 |
| GB | 2362139 | 11/2001 |
| JP | 2-286448 | 11/1990 |

* cited by examiner

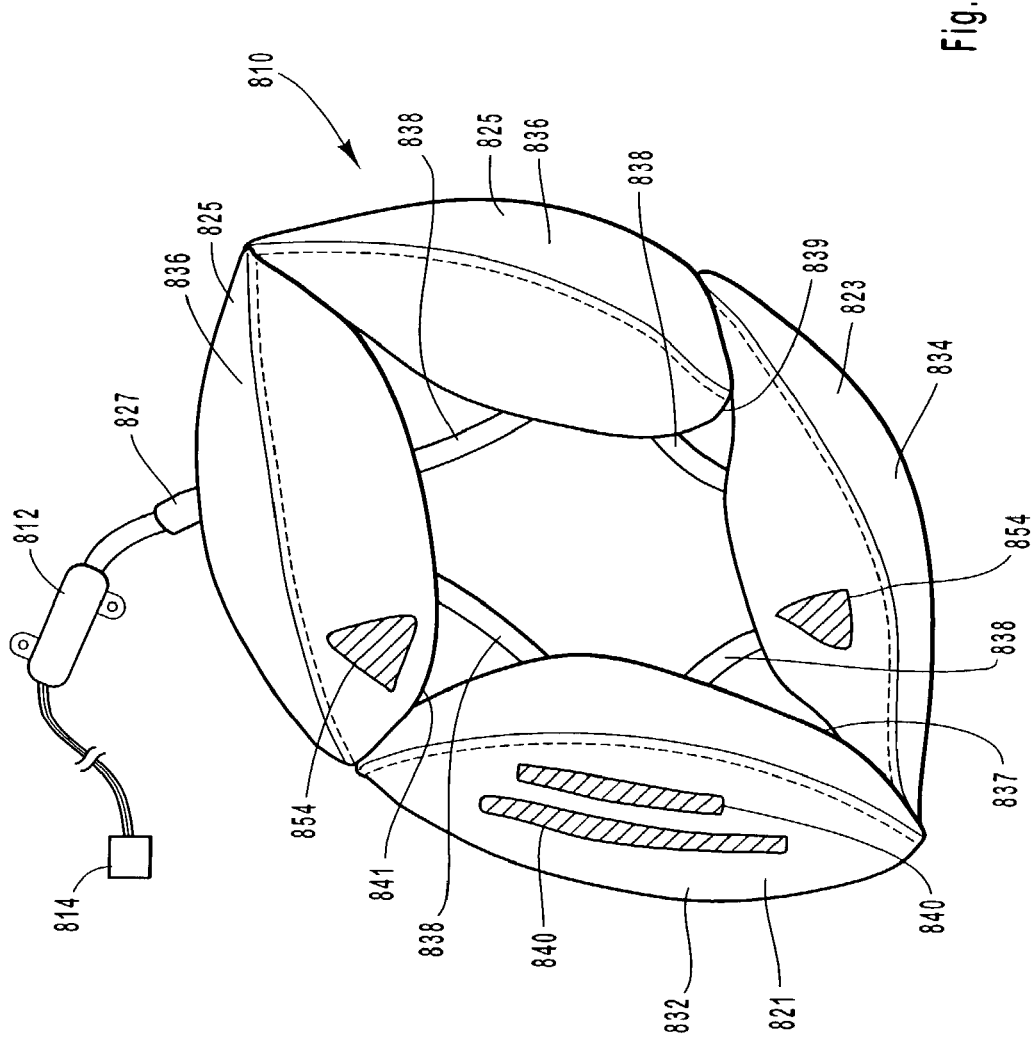

ONE PIECE CUSHION FOR PERSONAL AIRBAG

BACKGROUND OF THE INVENTION

1. Field of the Invention

The present invention relates to vehicular safety. More specifically, the present invention relates to a novel one piece woven airbag that results in airbag systems that are smaller, more compact, lighter-weight, and less expensive to produce than previous airbags.

2. Description of the Related Art

Inflatable safety restraints or airbags enjoy widespread acceptance as passive passenger restraints for use in motor vehicles. Airbags have built a reputation of preventing numerous deaths and injuries over the years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life saving potential of airbags and the need to encourage their use, production, and development.

In part as a result of the benefits such as those described above, automakers are now required to install airbags in most new vehicles manufactured for sale in the United States. Many automobile manufacturers have turned this airbag technology requirement into a marketing tool. Enticed by the promise of added safety, vehicle purchasers frequently seek out vehicles with sophisticated airbag systems.

Airbags are often installed in the steering wheel and in the dashboard on the passenger's side of the car. These airbags are often thick and dense because airbags are used for the primary deceleration of a vehicle occupant. In a large percentage of collisions the occupant is accelerated forward within the vehicle. Frontal airbags are generally constructed to inflate toward the vehicle occupant, often with significant force.

Such frontal airbags are generally housed within the dashboard, steering wheel, or other similar interior panels of a vehicle, and are covered by a trim cover panel. The trim cover panel covers the compartment that contains the airbag module. Such airbag covers are typically made of rigid plastic, and are made to open by the pressure from the deploying airbag. During deployment of the airbag, it is preferable to retain the airbag cover in at least partial attachment to the vehicle to prevent the airbag cover from flying loose in the passenger compartment. If the airbag cover were allowed to detach and freely move into the passenger compartment, it could cause injury to a passenger.

Airbags are generally linked to a control system within the vehicle that triggers their initiation when a collision occurs. This control system is often referred to as an electronic control unit (or "ECU"). The ECU includes a sensor that continuously monitors the acceleration and deceleration of the vehicle. This information is sent to a processor which processes it using an algorithm to determine if a deceleration experienced by the vehicle is a collision or not. If this accelerometer measures an abnormal deceleration, such as one caused by a collision event, it triggers the ignition of an airbag inflator.

When the processor of the ECU determines, based on a set of pre-determined criteria, that the vehicle is experiencing a collision, the ECU transmits an electrical current to an initiator assembly. The initiator assembly is in turn connected to an inflator that is coupled to the airbag module. The initiator activates the inflator. An inflator is a gas generator that typically uses a compressed or liquefied gas or mixture of gases, a solid fuel, or some combination of the two, to rapidly generate a large volume of inflation gas. This inflation gas is then channeled, often through a segment of specialized tubing called a gas guide, to the airbag. The gas inflates the airbag, allowing it to absorb the impact of the vehicle occupants and thus protecting them from impact against the steering column, the windshield, or the instrument panel.

As experience with the manufacturer and use of airbags has progressed, the engineering challenges in their design, construction, and use have become better understood. For example, airbags are currently designed to be large and bulky, based in part on the assumption that such size is needed in order to provide the airbag with the sufficient structural integrity so that the airbag does not overly deflate or compress during a crash due to the force of the occupant impact. However, problems have been noted to occur with such large and bulky airbags in that they can often be difficult to install in vehicles such as small or compact models where space in the passenger compartment is at a premium.

Moreover, such large and bulky airbags often require multiple or complex inflator units in order to guarantee that the airbag with promptly and properly inflate during a crash. These large and bulky inflators create additional problems because not only do they further increase the size and complexity of the airbag system, but are often also very expensive. More importantly, multiple and complex inflators can be very difficult to assemble, install, or repair, thereby increasing the likelihood that an airbag system will malfunction during a crash due to improper installation.

Furthermore, using a large and bulky airbag often raises the production costs of the vehicle significantly. As the size of the airbag increases, more and more packaging must be bought and used to adequately house the airbag system. Moreover, as large and bulky airbags are often difficult to work with, the labor and other costs associated with folding, assembling, and installing the airbag are also increased. Such increases in costs are extremely important because in the competitive automobile industry, even slight increases in costs can greatly affect the overall profit margin on a mass-produced vehicle.

Finally, large and bulky airbags are often very massive and heavy, which in turn has the disadvantage of increasing the overall weight of the vehicle. Vehicle weight is a crucial component in vehicle design because increases in the weight of the vehicle may correspond to a decrease in qualities important to consumers such as fuel economy, acceleration, and overall handling. As such, large and bulky airbag systems often mean that manufacturers must make difficult decisions as to whether the increased safety provided by airbags is worth the decrease in vehicle performance and customer satisfaction.

Accordingly, it would be an advancement in the art to create a novel airbag system that is lighter, smaller, and more compact that the previously known airbag systems, yet still provides the occupant with ample impact protection during a crash. It would be another advancement to provide a new airbag that would lower the overall cost associated with adding an airbag to a vehicle. Additionally, it would be an advancement to create an airbag that required less folding or other assembly procedures during production. It would be a further advancement to produce an airbag that did not require the use of multiple or complex inflators in order to insure that the airbag fully inflated during a crash.

BRIEF SUMMARY OF THE INVENTION

The apparatus of the present invention has been developed in response to the present state of the art, and in particular, in response to the problems and needs in the art that have not yet been fully solved by currently available personal airbag cushions. Thus, the present invention to provides an airbag cushion that is smaller, more compact, less expensive to produce, and lighter-weight than previously known airbag cushions.

In accordance with the present invention as embodied and broadly described herein in the preferred embodiment, a one-piece woven airbag cushion is provided. Specifically, the one-piece woven airbag cushion comprises an airbag that is small and compact, yet affords the vehicle occupants with ample impact protection during a crash.

In one embodiment, the airbag cushion comprises three inflatable chambers that are capable of being filled with air or gas by an inflator so as to provide a vehicle occupant protection from harmful impact during a crash. These inflatable chambers are in fluid communication with each other. "Fluid communication" means that air or inflation gas is able to flow between the inflatable chambers.

Preferably, the airbag cushion comprises three inflatable chambers that have been constructed such that the inflatable chambers form a generally triangular shape when the airbag is inflated. In order to ensure that the airbag cushion forms and maintains this generally triangular shape, one or more tethers are preferably added to the inflatable chambers. Additionally, one or more attachment points may also be added to lock the inflatable chambers into a position that will form and maintain the generally triangular shape when the airbag is inflated.

To protect a vehicle occupant during a crash, one of the inflatable chambers constitutes an inflatable impact chamber. An "inflatable impact chamber" is an area of the airbag that has been designed such that when an inflation gas is infused into the cushion during a vehicle crash, the inflatable impact chamber inflates and presents a surface to receive the impact of the body of a vehicle occupant. Preferably, the airbag cushion is constructed such that when the airbag cushion is inflated, the inflatable chamber that is located closest to the seated occupant is the inflatable impact chamber.

Additionally, the airbag cushions of the present invention are constructed such that one of the inflatable chambers functions as one or more inflatable support columns. An "inflatable support column" is an area of an airbag cushion that has been made to give compression resistance to the inflatable impact chamber such that the inflatable support column prevents the inflatable impact chamber from compressing or delaying in a manner that would allow harmful impact to the occupant. More specifically, the inflatable support column provides compression resistance to the inflatable impact chamber that prevents the inflatable impact chamber from compressing or deflating due to the force of the impact with the vehicle occupant.

In some embodiments, the airbag cushion further comprises a second inflatable support column. This second inflatable support column provides additional compression resistance to the inflatable impact chamber during a crash. Preferably, one of the inflatable chambers is designed to function as the second inflatable support column.

In one embodiment, the airbag comprises a first inflatable chamber, a second inflatable chamber, and a third inflatable chamber. The first inflatable chamber has been made such that when the airbag cushion is inflated, the first inflatable chamber intersects the second inflatable chamber to form a first angle. Similarly, the second inflatable chamber intersects the third inflatable chamber to form a second angle and the first inflatable chamber intersects the third inflatable chamber to form a third angle. Preferably, each of the first, second, and third angles may be selected to be less than about 80°. However, in other embodiments, the first, second, and third angles are configured such that the sum of the measures of the first, second, and third angles is about 180°. Still other embodiments will have the measure of one or more of the first, second, or third angles equal to and/or greater than about 80°.

Generally, the airbags of the present invention are constructed such that in the uninflated and unfolded configuration, the airbag cushion comprises a generally, flat, two-dimensional structure that is capable of receiving and retaining a volume of inflation gas. However, once a volume of an inflation gas has been injected into the airbag, the airbag cushion inflates and converts from the flat, two-dimensional structure to the desired three-dimensional shape.

The airbag cushions of the present invention are formed by having two relatively flat membranes, a first membrane and a second membrane, that have been attached together to from an airbag structure capable of receiving and retaining a volume of inflation gas. Such membranes are generally made of nylon or woven fabric and are connected together to form a one-piece structure through methods such as weaving, sewing, ultra-sonic welding, or the like. Preferably, weaving is used such that the airbag cushions constitute one-piece woven airbag cushions.

Some embodiments may be made such that the airbag cushion includes one or more uninflatable regions and/or chamber dividers. These uninflatable regions and chamber dividers are areas of the airbag cushion that are not inflated by the inflation gas and have the overall effect of changing the properties of the inflated airbag cushion.

Additional embodiments may be made in which one or more of the inflatable chambers are constructed to comprise a neck, a body, and/or extending arms. Still further embodiments may be made in which one or more of the inflatable chambers include a cutout for receiving a neck. Addition of such features has the overall effect of altering the shape of the inflatable chambers, which in turn, modifies the overall three-dimensional shape and protective capabilities of the airbag cushion.

In yet an alternative embodiment, the airbag cushion may be made to include an inflation port. An inflation port is an inlet located on the airbag cushion through which a volume of inflation gas may be introduced in the inflatable chambers. The inflation port may connect to the airbag cushion at various locations such as through the neck, through the body, or through one of the inflatable chambers.

Still other embodiments of the invention may be constructed in which the airbag cushion comprises only first inflatable chamber and a second inflatable chamber. These two inflatable chambers are in fluid communication with each other and are connected via one or more tethers.

The embodiment comprising the two inflatable chambers may be further configured such that when the airbag cushion is inflated, the first inflatable chamber intersects the second inflatable chamber to form a first angle. The first angle is constructed such that the first chamber and the second chamber are not coplanar. Preferably, the measure of the first angle will be less than about 90° such that the airbag cushion in the inflated configuration is generally V-shaped.

The embodiment of the present invention that comprises only two inflatable chambers may be further configured such that one of the inflatable chambers functions as an inflatable impact chamber and the other inflatable chamber functions as one or more inflatable support columns. More specifically, an embodiment may be made in which the first inflatable chamber functions as an inflatable impact chamber and the second inflatable chamber functions as one or more inflatable support columns.

In yet an alternative embodiment, the airbag cushion of the present invention may be made to comprise a first inflatable chamber, a second inflatable chamber, and one or more additional inflatable chambers. In some embodiments, the number of the additional inflatable chambers will be two such that the airbag cushion has four inflatable chambers. However other embodiments may be made using only one additional inflatable chamber. Still further embodiments will have the airbag cushion comprise more than two additional inflatable chambers.

Preferably, the embodiment comprising the first, second, and the one or more additional inflatable chambers is made such that the inflatable chambers are in fluid communication with each other and are connected together via one or more tethers. Moreover, the first, second, and the one or more additional inflatable chambers are further constructed such that when the airbag cushion is inflated, the inflatable chambers form a generally polygonal shape. More specifically, the inflatable chambers are constructed such that when the airbag cushion is inflated, the airbag cushion forms any regular or irregular polygonal shape, including, but not limited to a rectangle, a triangle, a square, a pentagon, a hexagon, a heptagon, an octagon, a decagon, or the like.

The embodiment having the first, second, and the one or more additional inflatable chambers may further be configured such that when the airbag cushion is inflated, the first inflatable chamber intersects the second inflatable chamber to form a first angle. The first angle is constructed such that the first chamber and the second chamber are not coplanar. Alternatively, this embodiment may further be made such that the second inflatable chamber intersects the one or more additional inflatable chambers to form a second angle, the second angle being configured such that the second inflatable chamber and the one or more additional inflatable chambers are not coplanar. Additionally, the airbag cushion may be constructed such that the first inflatable chamber intersects the one or more additional inflatable chambers to form a third angle, the third angle being configured such that the first inflatable chamber and the one or more additional inflatable chambers are not coplanar. Preferably, the measure the first angle, the measure of the second angle, and/or the measure of the third angle is less than about 90°. However, embodiments may be made in which the measure the first, second, and third angles is greater than or equal to about 90°.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 is a perspective view of a further embodiment of the airbag cushion of the present invention shown in its inflated configuration.

DETAILED DESCRIPTION OF THE PREFERRED EMBODIMENTS

The presently preferred embodiments of the invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

Figure 1:
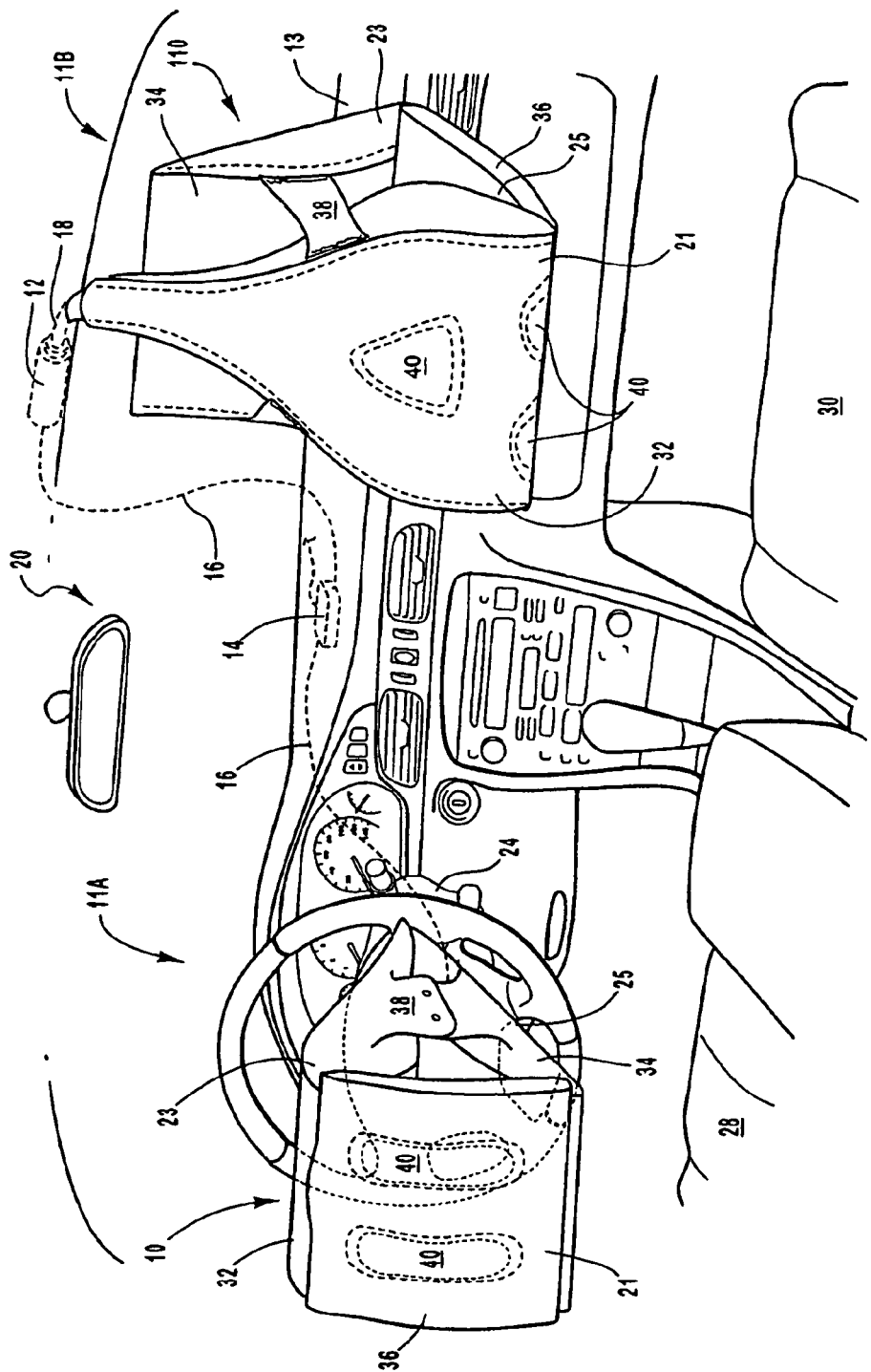
FIG. 1 is a perspective view of the front seating area of a vehicle in which two embodiments of the airbag cushion of the present invention have been installed.

Referring now to FIG. 1, the front seating area 20 of a vehicle including the one-piece woven airbag systems according to the present invention is depicted. More specifically, the front seating area 20 is shown including a one-piece woven airbag system 11A positioned in front of driver seat 28 and a similar system 11B positioned in front of passenger seat 30. System 11A includes a rear inflating airbag cushion 10 mounted on the steering column 24, whereas system 11B includes a top inflating airbag cushion 110 mounted on the front header 13. In FIG. 1, both the airbag cushions 10, 110 of the systems 11A, 11B are shown deployed and inflated.

The systems 11A, 11B also include a sensor 14, an inflator unit 12, and a trim panel (not shown). The inflator unit 12 is a pyrotechnic or other device that is in fluid communication with the airbag cushions 10, 110. This inflator 12 is made such that it is capable of inflating the airbag cushions 10, 110 during a crash or accident by rapidly delivering a volume of inflation gas to the airbag cushions 10, 110. If necessary, multiple inflator units 12 and/or a gas guide 18 maybe added to the systems 11A, 11B to help facilitate the rapid inflation of airbag cushions 10, 110.

The sensor 14 used in systems 11A, 11B is an accelerometer or other device that is capable of sensing or detecting a crash. If such a crash occurs, the inflator 12, which communicates with the sensor 14 through lines 16, becomes activated. Once activated, the inflator 12 delivers a volume of pressurized inflation gas to the airbag cushions 10, 110. Such an influx of the pressurized inflation gas causes the cushion airbags 10, 110 to rapidly inflate and convert into a three-dimensional shape.

Generally, the inflated airbag cushions 10, 110 have been specifically designed to function as frontal airbags in that the airbag cushions 10, 110 prevent the vehicle occupant from harmfully impacting the steering column 24, the front header 13, or other parts of the front seating area 20. These airbag cushions 10, 110 comprise three inflatable chambers, a first inflatable chamber 32, a second inflatable chamber 34, and a third inflatable chamber 36. These inflatable chambers 32, 34, 36 are capable of receiving and being inflated by the inflation gas.

In the embodiment shown in FIG. 1, the airbag cushions 10, 110 are constructed such that the inflatable chambers 32, 34, 36 are in fluid communication which each other. "Fluid communication" means that air or inflation gas is able to flow between the inflatable chambers 32, 34, 36. Additionally, the inflatable chambers 32, 34, 36 may also be made to be in fluid communication with the inflator 12.

Preferably, the airbag cushions 10, 110 are designed such that when the airbag cushions 10, 110 are inflated, the inflatable chambers 32, 34, 36 form a generally 110 triangular shape. More specifically, the airbag cushions 10, 110 are constructed such that the third inflatable chamber 36 forms the bottom or base portion of the triangular shape and the first and second inflatable chambers 32, 34 form the leg or side portions of the triangular shape. The shape and subsequent angles of the base portion as well as the side portions of the triangular shaped three-dimensional airbag cushion may be varied in order to account for various factors such as the positioning and orientation of the occupant within the vehicle and/or the interior design of the vehicle.

Referring still to FIG. 1, the airbag cushions 10, 110 also may include one or more tethers 38. Tethers 38 function to ensure that the airbag cushions 10, 110 form and maintain the preferred shape when the airbag cushions 10, 110 are inflated. Preferably, the tethers 38 are used to connect an outside portion of one of the inflatable chambers 32, 34, 36 to an outside portion of a different inflatable chamber 32, 34, 36. In the embodiments shown in FIG. 1, the one or more tethers 38 connect an outside portion of the first inflatable chamber 32 with an outside portion of the second inflatable chamber 34, thereby holding airbag cushions 10, 110 in a generally triangular shape. An "outside portion" is defined as the portion of the inflatable chamber that lies on an exterior side of the cushion in the inflated configuration.

As mentioned above, the airbag cushions 10, 110 having the inflatable chambers 32, 34, 36 are constructed to protect a vehicle occupant seated in either driver's seat 28 or passenger seat 30. In order to accomplish this, one of the inflatable chambers 32, 34, 36 functions as an inflatable impact chamber 21. An "inflatable impact chamber is an area of the airbag cushion that has been designed to receive the impact of a vehicle occupant during a crash. More specifically, the inflatable impact chamber is a distinct area of the airbag cushions 10, 110 specifically formed to present a surface that receives the impact of a vehicle occupant.

Of the three inflatable chambers 32, 34 36, the inflatable chamber that is located closest to the occupant seats 28, 30 when the airbag cushions are in the inflated configuration is preferably made to function as the inflatable impact chamber 21. For example, when airbag cushion 10 is inflated, the third inflatable chamber 36 is positioned most proximate to the driver's seat 28. Accordingly, in this embodiment, it is the third chamber 36 that is the inflatable impact chamber 21. On the other hand, when airbag cushion 110 is inflated, the first inflatable chamber 32 is positioned most proximate to the passenger seat 30. Therefore, in the airbag cushion 110, the first chamber 32 functions as the inflatable impact chamber 21.

The cushion airbags 10, 110 are also designed such that one of the inflatable chambers 32, 34, 36 functions as one or more inflatable support columns 23. These inflatable support columns 23 are in fluid communication with the inflatable impact chamber 21. An "inflatable support column" is an area of an airbag cushion that gives compression resistance to the inflatable impact chamber 21 such that the inflatable support column 23 prevents the inflatable impact chamber 21 from compressing or deflating in a manner that would allow the occupant to harmfully impact a portion of the front seating area 20. More specifically, the inflatable support column 23 provides compression resistance to the inflatable impact chamber 21, thereby preventing the inflatable impact chamber 21 from compressing or deflating due to the force of the occupant impacting the impact chamber 21.

For example, in the airbag cushion 10, the first chamber 32 has been constructed as an inflatable support column 23 to give compression resistance to the inflatable impact chamber 21 made from the third chamber 36. Similarly, in the airbag cushion 110, the second chamber 34 functions as an inflatable support column 23 designed to give compression resistance to the inflatable impact chamber 21 which has been made from the first chamber 32.

In some instances, it is preferable to have one of the inflatable chambers 32, 34, 36 function as a second inflatable support column 25 that is in fluid communication with both the inflatable impact chamber 21 and the inflatable support column 23. Like the inflatable support column 23, the second inflatable support column 25 also provides compression resistance to the inflatable impact chamber 21. Preferably, the airbag cushions 10, 110 are designed such that the inflatable chambers 32, 34, 26 that is not functioning as either the inflatable impact chamber 21 or the inflatable support column 23 constitutes the second inflatable support column 25.

Both of the embodiments shown in FIG. 1 have been designed such that the inflatable chamber that was not configured as either the impact chamber 21 or the inflatable support column 23 functions as a second inflatable support column 25. Specifically, in the rear inflating airbag cushion 10 shown in FIG. 1, the third chamber 36 functions as the impact chamber 21 and the first chamber 32 functions as the inflatable support column 23. Accordingly, the remaining inflatable chamber, the second chamber 34, functions as the second inflatable support column 25.

Conversely, in the embodiment shown as top inflating cushion 110, the first chamber 32 functions as the impact chamber 21 and the second chamber 34 functions as the inflatable support column 23. Therefore, in this embodiment, the remaining unused inflatable chamber, the third chamber 36, functions as the second inflatable support column 25.

By constructing the airbag cushions 10, 110 to include one or more support columns 23, 35, significant advantages may be achieved over many previously known airbag systems. Specifically, these inflatable support columns 23, 25 provide compression resistance to the inflatable impact chamber 21 to prevent the inflatable impact chamber 21 from compressing or deflating in a manner that would allow the occupant to harmfully impact the steering column 24, the front header 13, and/or other parts of the front seating area 20. Such compression resistance has the effect of increasing the overall structural integrity of both the inflatable impact chamber 21 as well as the airbag cushion in general. This increase in structural integrity, in turn, allows the airbag cushions of the present invention to be smaller, lighter, and more compact, yet still capable of providing the vehicle occupant with ample impact protection during a crash.

Additionally, the overall smaller volume of the present airbag provides the additional advantages for airbag and vehicle manufacturers. As noted above, many prior art airbags are large and bulky, and thus require multiple inflators in order to properly inflate during a crash. However, because the airbags of the present invention are smaller and more compact, they may be inflated with a single inflator unit. Such a change is a significant advancement as it allows the manufacturers to save both the cost and hassle associated with working with multiple inflator units. Moreover, the present invention also allows the type of inflator to be changed. Unlike prior art airbags that necessitate complex and/or large inflator to function properly, the airbags of the present invention may be inflated with a single inflator unit that is smaller, simpler, and cheaper to produce and use.

Figure 2:
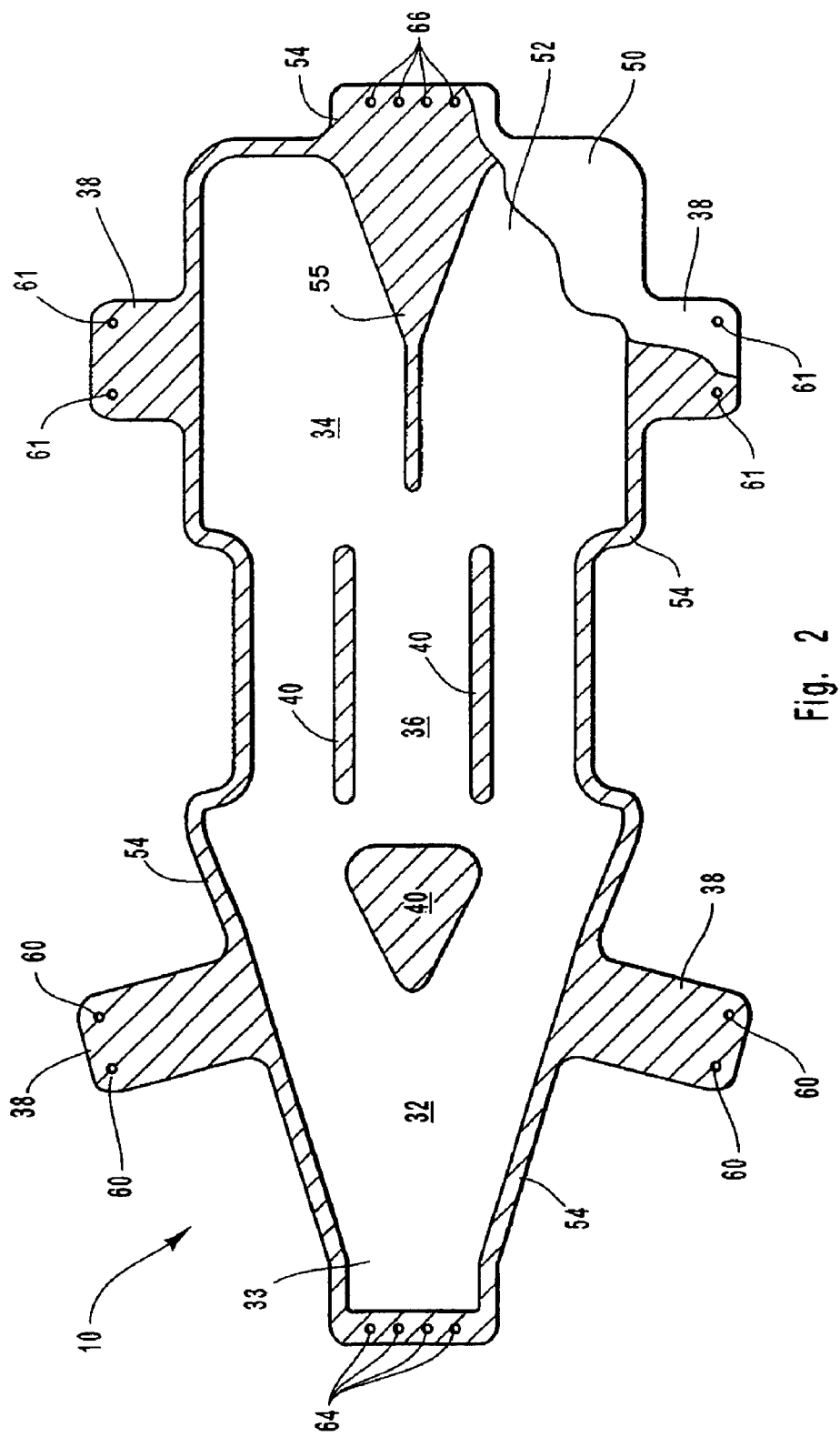
FIG. 2 is a plan view of the uninflated and unfolded configuration of one of the embodiments of FIG. 1.
Figure 3:
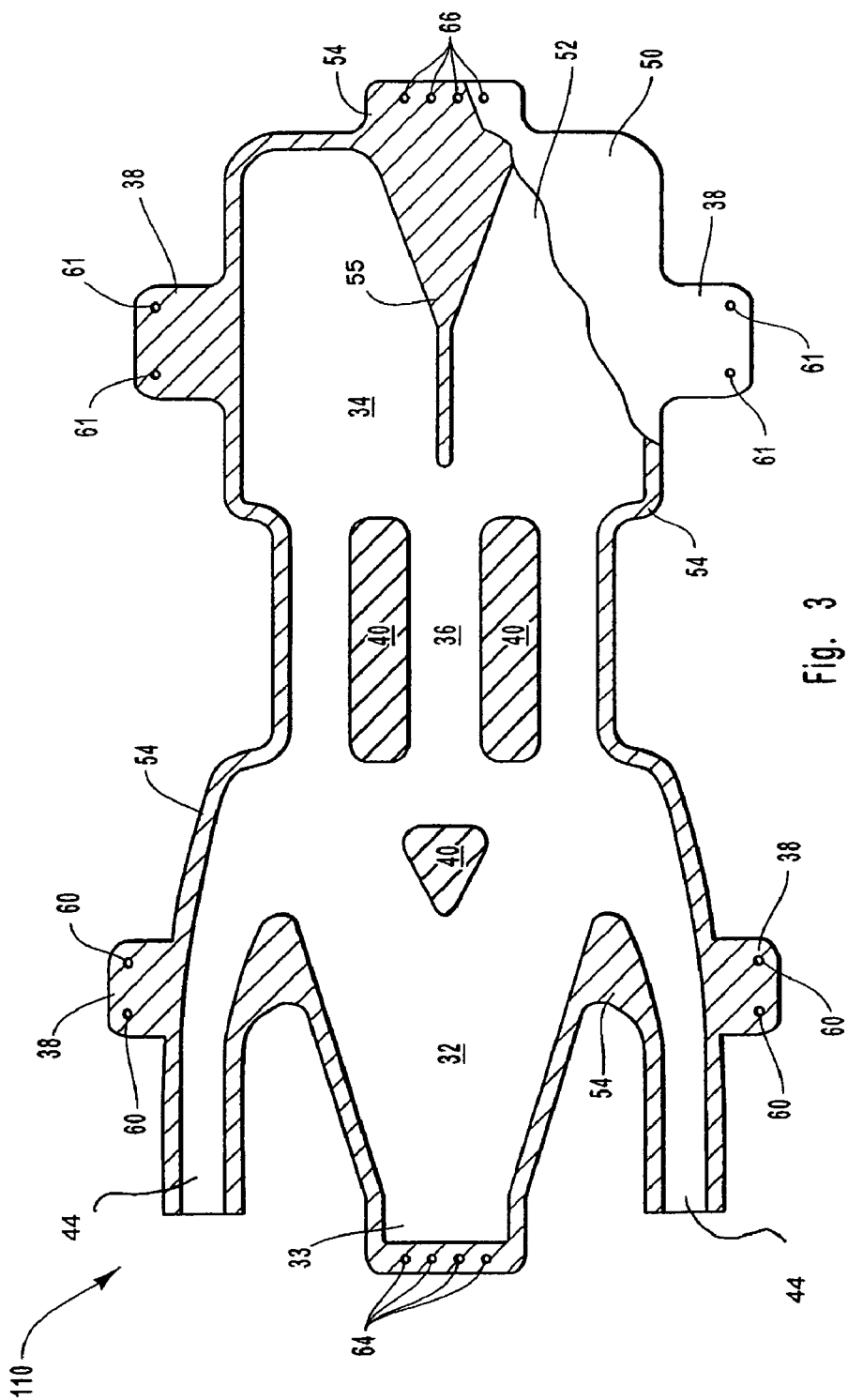
FIG. 3 is a plan view of the uninflated and unfolded configuration of the other embodiment shown in FIG. 1.

Referring now to FIGS. 2 and 3, the airbag cushions 10, 110 are shown in their unfolded and uninflated configuration. Specifically, FIG. 2 shows the uninflated and unfolded configuration of the rear inflating airbag cushion 10 whereas FIG. 3 shows the uninflated and unfolded configuration of the top inflating airbag cushion 110.

Generally, when airbag cushions 10, 110 are uninflated and unfolded, the airbag cushions 10, 110 comprise flat, two-dimensional airbag structures capable of receiving and retaining a volume of inflation gas. However, as the size of the uninflated airbag cushions 10, 110 is usually larger than the storage space provided within the vehicle, the airbag cushions 10, 110 are usually designed such that they may be compacted by either rolling and/or folding.

The airbag cushions 10, 110 are constructed such that if a volume of inflation gas is added to the airbag cushions 10, 110, the airbag cushions 10, 110 rapidly convert from the flat two-dimensional uninflated configuration (shown in FIGS. 2 and 3) to the three-dimensional triangular structures (shown in FIG. 1). Preferably, the airbag cushions 10, 110 are constructed such that this conversion between the uninflated and inflated configurations occurs at a rate that is rapid enough to allow the airbag cushions 10, 110 to protect a vehicle occupant during a crash.

The airbag cushions 10, 110 are formed by having two relatively flat membranes, a first membrane 50 and a second membrane 52, that have been attached together to form an airbag structure capable of retaining and receiving a volume of inflation gas. Such membranes 50, 52 are generally made of a nylon or woven fabric and are attached to form a one-piece structure through methods such as weaving, ultrasonic welding, sewing, or the like. Preferably, weaving is used such that the airbag cushions 10, 110 constitute one-piece woven airbag cushions.

As the airbag cushions 10, 110 comprise a one-piece structure, the inflatable chambers 32, 34, 36 are designed to comprise adjacent sections of the airbag cushions 10, 110. Preferably, the section comprising the first inflatable chamber 32 is located at an end of the cushion airbags 10, 110 and the section comprising the second inflatable chamber 34 is located on the opposite end. The section comprising the third chamber 36 is preferably positioned between the first chamber 32 and the second chamber 34.

Of course however, other embodiments may be made in which the size, location and/or orientation of the inflatable chambers 32, 34, 36 differs from that which is shown in FIGS. 2 and 3. For example, some embodiments may position the third inflatable chamber 36 on an end of the airbag cushions. Still other embodiments may be made such that when the airbag cushion is uninflated, the first inflatable chamber 32 is located directly adjacent to the second inflatable chamber 34.

As discussed above, the airbag cushions 10, 110 may be constructed to include one or more tethers 38. These tethers 38 connect an outside portion of the first inflatable chamber 32 with an outside portion of the second inflatable chamber 34 such that when the airbag cushions 10, 110 are inflated, the first, second, and third chambers 32, 34, 36 form a generally triangular structure. An "outside portion" is defined as the portion of an inflatable chamber that lies on an exterior side of the inflated airbag cushion.

The tethers 38 are made of fabric or similar material that is capable of holding the inflatable chambers 32, 34, 36 in the proper position. Preferably, the tethers 38 hold the inflatable chambers 32, 34, 36 by connecting, via fasteners or otherwise, one or more first attachment points 60 located proximate the first chamber 32 to one or more second attachment points 61 positioned proximate the second chamber 34.

In addition, the airbag cushions 10, 110 may be formed with one or more first chamber attachment points 64 and one or more second chamber attachment points 66. The first chamber attachment points 64 are designed to connect, via fasteners or otherwise, to the second chamber attachment points 66. By connecting the first chamber attachment points 64 to the second chamber attachment points 66, the airbag cushions 10, 110 lock the inflatable chambers 32, 34, 36 in the desired position, thereby ensuring that upon inflation, the airbag cushions 10, 110 form and maintain a generally triangular shape.

The airbag cushions 10, 110 may further include specific regions or areas that cannot be inflated by the inflation gas such as one or more uninflatable regions 54 and/or one or more chamber dividers 40. Both the uninflatable regions 54 and the chamber dividers 40 are areas of the airbag cushions 10, 110 that have been sealed through methods such as by weaving, ultrasonic welding, sewing, and the like such that the inflation gas is prevented from entering or inflating these areas. Addition of such uninflatable regions 54 and/or chamber dividers 40 has the effect of changing the overall protective properties of the inflated airbag cushions 10, 110.

The shape of the airbag cushions 10, 110 may further be altered by modifying one or more of the inflatable chambers 32, 34, 36 to include features such as a neck 33, a cutout 55 designed to receive the neck 33, and/or one or more extending arms 44 (see FIG. 3).

Figure 4:
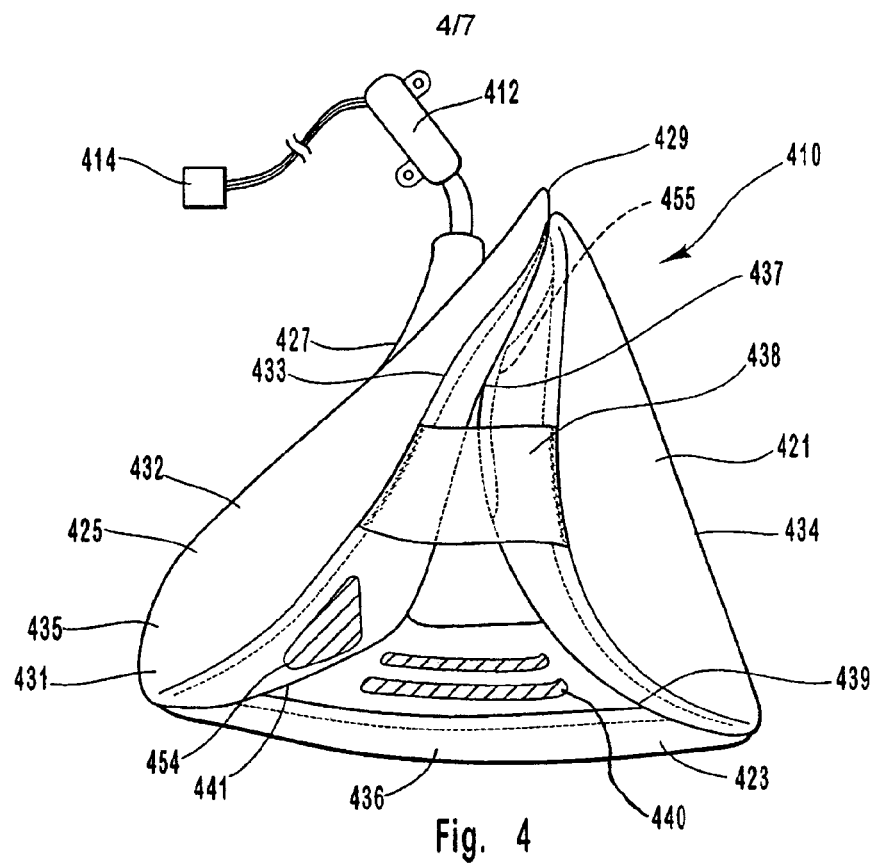
FIG. 4 is a perspective view of a further embodiment of the airbag cushion of the present invention shown in its inflated configuration.

Referring now to FIG. 4, a different embodiment of an airbag cushion according to the present invention is depicted. Specifically, FIG. 4 shows the inflated configuration of top inflating airbag cushion 410 that may be installed on a vehicle. The airbag cushion 410 is shown to be in fluid communication with an inflator 412. Connected to the inflator 412 is a sensor 414 that is capable of detecting and sensing a crash.

As with the previous embodiments, the airbag cushion 410 comprises three inflatable chambers, a first inflatable chamber 432, a second inflatable chamber 434, and a third inflatable chamber 436. These inflatable chambers 432, 434, 436 are made such that when inflated, the inflatable chambers 432, 434, 436 form a generally triangular shape. One or more tethers 438 that attach an outside portion of one of the inflatable chambers 432, 434, 436 to an outside portion of a different inflatable chamber 432, 434, 436. Specifically in FIG. 4, the one or more tethers 438 connect an outside portion of the first inflatable chamber 432 to an outside portion of the second inflatable chamber 434. The one or more tethers 438 are constructed to ensure that the inflated airbag cushion 410 achieves the desired triangular configuration. Additionally, one or more uninflatable regions 454 and/or chamber dividers 440 may also be added to the airbag cushion 410.

The airbag cushion 410 is further constructed such that when the airbag cushion 410 is inflated, the first inflatable chamber 432 intersects the second inflatable chamber 434 to form a first angle 437. Preferably, the first angle 437 is set such that if the airbag cushion 410 is inflated, the measure of the first angle 437 is less than about 80°.

The airbag cushion 410 likewise been designed such that when the airbag cushion 410 is inflated, the first inflatable chamber 432 intersects the third inflatable chamber 436 to form a third angle 441. Preferably, this third angle 441 is likewise set such that in the inflated configuration, the measure of the third angle 441 is less than about 80°.

Of course however, the scope of the present invention includes embodiments in which the measure of angles 437, 439, 441 differs from that which is shown in FIG. 4. For example, some embodiments may be made such that the sum of the measures of the first angle 437, the second angle 439, and the third angle 441 equals about 180° in the inflated configuration. Still other embodiments may be made such that if the airbag cushion 410 is inflated, the measure of one or more of the angles 437, 439, 441 is greater than about 80°. Other embodiments may be made such that if the airbag cushion 410 is inflated, the measure of one or more of the angles 437, 439, 441 is equal to about 80°. Yet further embodiments can be made such that in the when the airbag cushion is inflated, the measures of the first angle 437, the second angle 439, and the third angle 441 are substantially equal.

Referring still to FIG. 4, the inflatable chambers 432, 434, 436 are designed to protect a vehicle occupant during a crash or accident. Specifically, the second inflatable chamber 434 has been constructed to function as an inflatable impact chamber 421. At the same time, the third inflatable chamber 436 comprises one or more inflatable support columns 423 and the first inflatable chamber 432 comprises one or more second inflatable support columns 425.

In addition, the first inflatable chamber 432 of the airbag cushion 410 has been made to include a first end 429 and a second end 431. The first end 429 is the section of the first inflatable chamber 432 that is positioned near the inflator 412 in the inflated configuration and the second end 431 is the section of the first inflatable chamber 432 that is positioned opposite the first end 429.

A neck 433 may also be added to the first end 429 of the first chamber 432. Neck 433 comprises a narrow area of the first inflatable chamber 432. Alternatively, the first inflatable chamber 432 may also be constructed to comprise a body 435 that is a wider area of the first inflatable chamber 432. Preferably, the body 435 is positioned adjacent to the second end 431.

Of course however, other embodiments may be made in which the location and/or configuration of the neck 433 and/or the body 435 differs from that which is depicted in FIG. 4. For example, some embodiments may have a neck 433 and/or a body 435 added to either the second inflatable chamber 434 or the third inflatable chamber 436. Even further embodiments may be made in which one or more of the inflatable chambers 432, 434, 436 comprise a neck 433 and/or a body 435.

The airbag cushion 410 may also include an inflation port 427. An inflation port 427 is an inlet located on the airbag cushion 410 through which a volume of inflation gas may be introduced into the inflatable chambers 432, 434, 436. Preferably, this inflation port 427 is made to be in fluid communication with the inflatable chambers 432, 434, 436 as well as the inflator 412.

In the airbag cushion 410 the inflation port 427 connects to and is in fluid communication with the first inflatable chamber 432. More specifically, the airbag cushion is designed such that the inflation port 427 connects to the first inflatable chamber 433 through the neck 433. Of course, other embodiments may have the inflation port 427 positioned differently. For example, some embodiments may have the inflation port 427 connect to the first inflatable chamber 432 through the second end 431. Other embodiments may be made in which the inflation port 427 connect to the first inflatable chamber 432 through the body 435 adjacent to the second end 431. Still further embodiments may have the inflation port 427 connect to the airbag cushion through either the second inflatable chamber 434 or through the third inflatable chamber 436.

Alternatively, the airbag cushion 410 may also be made such that one or more of the inflatable chambers 432, 434, 436 comprises a cutout 455. The cutout 455 may be designed to receive a neck 433. Specifically in airbag cushion 410 depicted in FIG. 4, the second inflatable chamber 434 has been made to include a cutout 455 that is capable of receiving the neck 433 positioned on the first inflatable chamber 432. However, other embodiments may position one or more cutouts at other locations such as on the first inflatable chamber 432 and/or the third inflatable chamber 436. Even further embodiments will have one or more of the inflatable chambers 432, 434, 436 include a a cutout 455.

Figure 5:
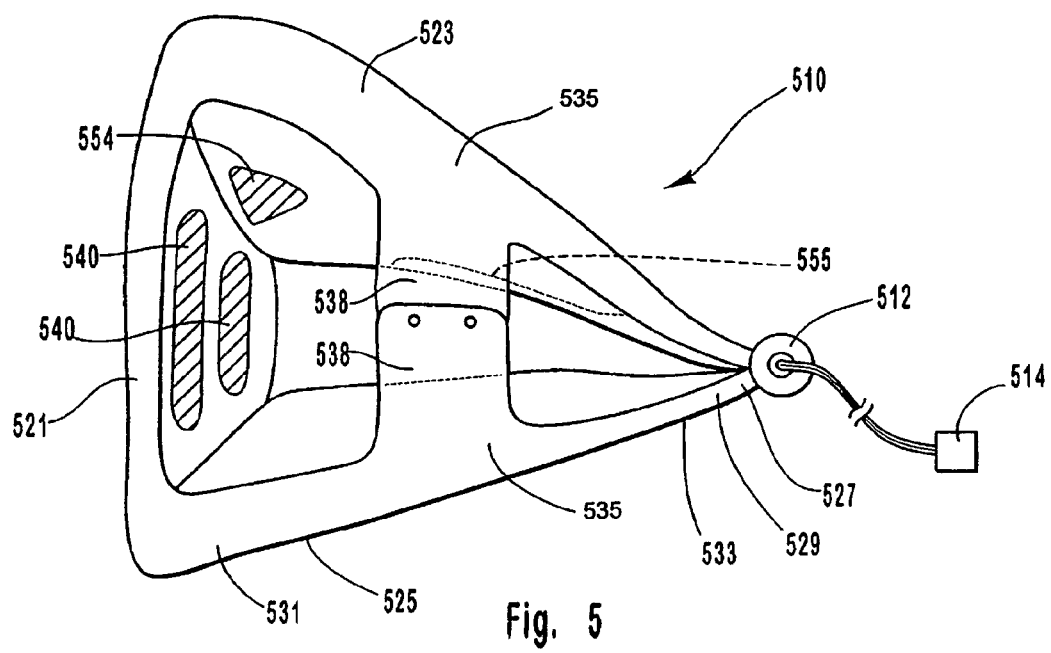
FIG. 5 is a perspective view of a further embodiment of the airbag cushion of the present invention shown in its inflated configuration.

Referring now to FIG. 5, the inflated configuration of a different embodiment of the present invention is depicted. Specifically, FIG. 5 depicts the inflated configuration of a rear inflating airbag cushion 510 that may be installed on a vehicle. The airbag cushion 510 is shown to be in fluid communication with an inflator 512. Connected to the inflator 512 is a sensor 514 that is capable of sensing and detecting a crash.

In this embodiment, airbag cushion 510 comprises an inflatable impact chamber 521, an inflatable support column 523, and a second inflatable support column 525. The inflatable impact chamber 521 is preferably connected to the inflatable support columns 523, 525 such that when the airbag cushion 510 is inflated, the shape of the airbag cushion 510 is generally a triangular-shaped three-dimensional structure.

The airbag cushion 510 may also include one or more tethers 538. As seen in FIG. 5, the one or more tethers 538 connect an outside portion of the inflatable support column 523 to an outside portion of the second inflatable support column 525. The one or more tethers 538 are constructed such that upon inflation, the airbag cushion 510 achieves and maintains the desired triangular shape. One or more uninflatable regions 554 and/or chamber dividers 540 may additionally be added to the airbag cushion 510.

The airbag cushion 510 may also be constructed such that the second inflatable support column 525 includes a first end 529 and a second end 531. Preferably, the first end comprises an area of the second inflatable support column 525 that is positioned proximate the inflator 512 when the airbag cushion 510 is in the inflated configuration. The second end 531 is the area of the second support column 525 that is positioned opposite the first end 529.

In addition, the second inflatable support column 525 may be constructed such that adjacent to the first end 529 is a neck 533. Preferably, neck 533 is a narrower area of the second inflatable support column 525. Alternatively, the second inflatable support column 525 may also be constructed to comprise a body 535 that is a wider area of the second inflatable support column 525. Preferably, this body 535 is positioned adjacent to the second end 531.

A cutout 555 may also be included within the airbag cushion 510. The cutout 555 is configured to receive the neck 533 and is preferably added to the inflatable support column 523. However, other embodiments may position the cutout 555 on the inflatable impact chamber 521 and/or on the second inflatable support column 525.

The airbag cushion 510 may also be made to comprise an inflation port 527 in fluid communication with both the inflator 512 and the airbag cushion 510. Preferably, the inflation port 527 is positioned on the airbag cushion 510 such that it connects to the second inflatable support column 525 through the neck 533. However, other embodiments may orient the inflation port 527 differently such that it connects to other portions of the airbag cushion 510. In particular, one such embodiment may be made such that the inflation port 527 connects to the second inflatable support column 525 through the body 535 adjacent the second end 531.

Figure 6A:
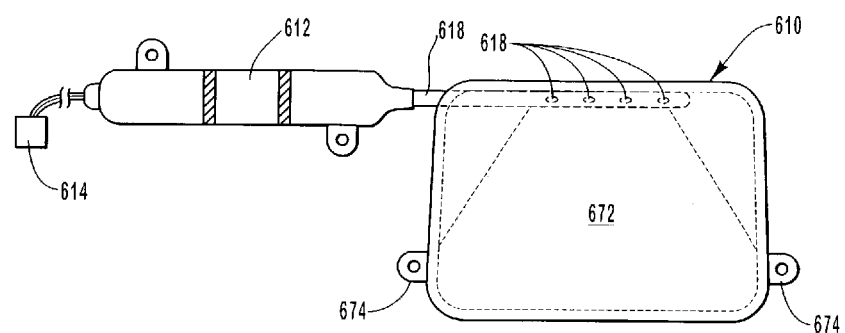
FIG. 6A is a side plan view of a further embodiment of the airbag cushion of the present invention shown in its uninflated and folded configuration.

Referring now to FIG. 6A, yet another embodiment of the airbag cushion of the present invention is depicted. Specifically, FIG. 6A shows the uninflated configuration of a top inflating airbag cushion 610 that is in fluid communication with an inflator 612. The airbag cushion 610 is capable of being installed on a vehicle. Attached to the inflator 612 is a sensor 614 capable of sensing and detecting a vehicle crash. A gas guide 618 comprising a tube with multiple holes, has additionally been connected to the inflator 612.

The airbag cushion 610 shown in FIG. 6A has been compacted via rolling and/or folding to facilitate the placement of the airbag cushion 610 within a vehicle. Packaging 672 with connecting tabs 674 has also been added.

Figure 6B:
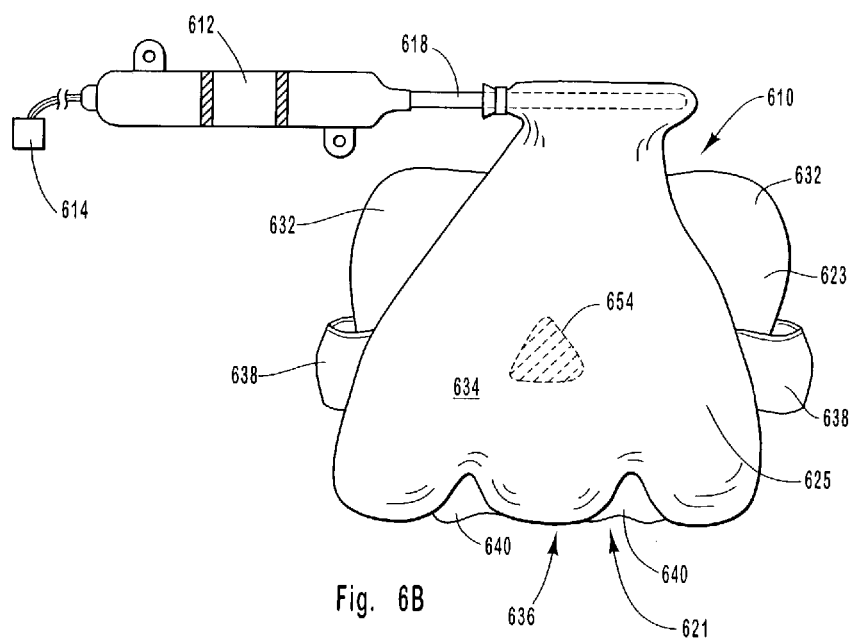
FIG. 6B is a side view of the inflated configuration of the embodiment shown in FIG. 6A.

Referring now to FIG. 6B, the inflated and unfolded configuration of the airbag cushion 610 shown in FIG. 6A is depicted. In particular, FIG. 6B depicts the airbag cushion 610 of FIG. 6A after it has been unfolded and converted into its inflated configuration by a volume of inflation gas supplied by the inflator 612.

The airbag cushion 610 comprises three distinct chambers, a first inflatable chamber 632, a second inflatable chamber 634, and a third inflatable chamber 636 which are held and supported into the proper position by one or more tethers 638. One or more uninflatable regions 654 and/or chamber dividers 640, areas of the airbag cushion 610 which cannot be inflated by the inflation gas, have also been added to airbag cushion 610.

The third inflatable chamber 636 is preferably located proximate the bottom of the airbag cushion 610 and is configured to function as an inflatable impact chamber 621. At the same time, the first inflatable chamber 632 functions as an inflatable support column 623 and the second inflatable chamber 634 functions as the second inflatable support column 625.

By making the third inflatable chamber 636 the inflatable impact chamber 621, the airbag cushion 610 positions the inflatable impact chamber 621 proximate the bottom of the airbag cushion 610. In some instances, such positioning of the inflatable impact chamber 621 may indeed be preferably because it allows the airbag cushion 610 to function as an overhead airbag. Unlike frontal airbags, an overhead airbag is an airbag that is positioned in a vehicle to be over the occupants' head and is designed to prevent the occupant from impacting the vehicle's roof during a crash or a rollover accident. Accordingly, if the airbag cushion 610 is installed on or proximate the vehicle's roof, the airbag cushion 610 can inflate to prevent the occupant from impacting the roof the vehicle during a crash or a rollover accident.

Figure 7:
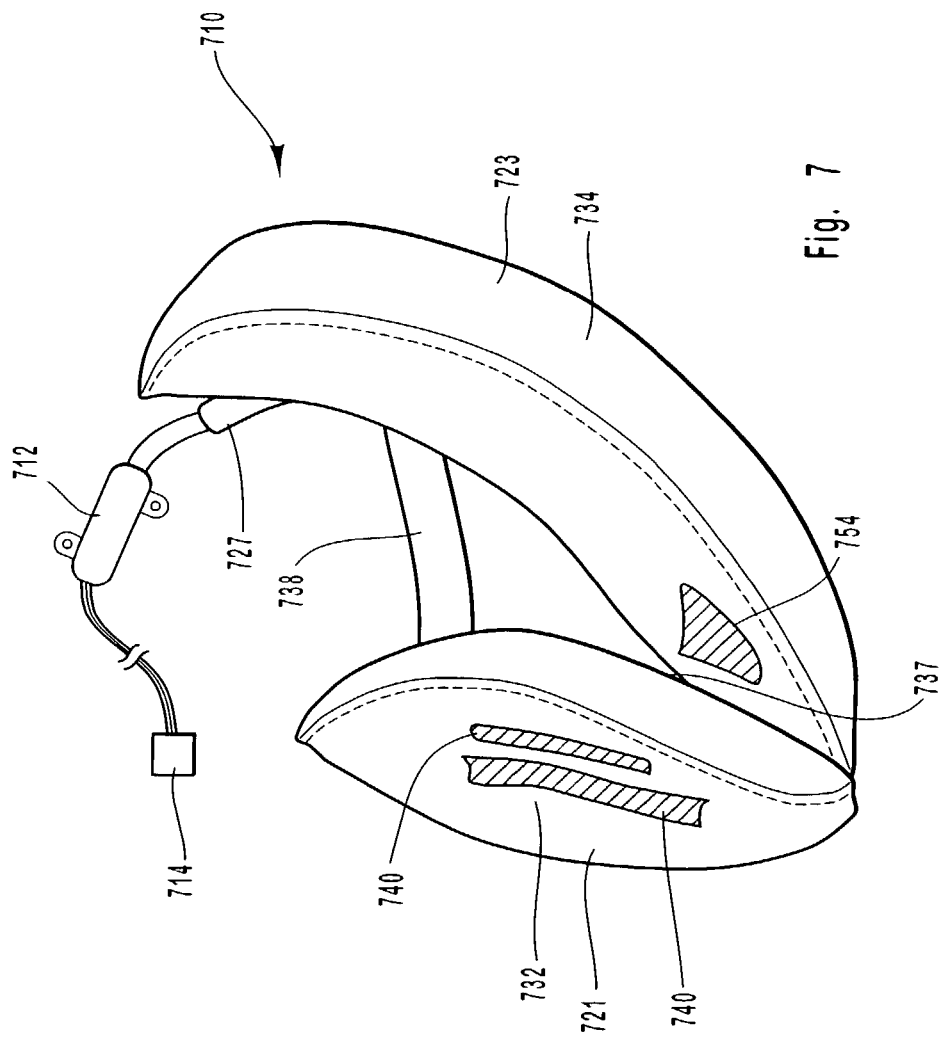
FIG. 7 is a perspective view of a further embodiment of the airbag cushion of the present invention shown in its inflated configuration.

Referring now to FIG. 7, a different embodiment of an airbag cushion according to the present invention is depicted. Specifically, FIG. 7 shows the inflated configuration of an airbag cushion 710 that may be installed on a vehicle and is capable of functioning as a frontal airbag. In FIG. 7, the airbag cushion 710 is shown to be in fluid communication with an inflator 712, which in turn, is attached to a sensor 714.

Unlike the previous embodiments described above, the airbag cushion 710 does not comprise three distinct chambers. Rather, the airbag cushion 710 only comprises two inflatable chambers: a first inflatable chamber 732 and a second inflatable chamber 734. These inflatable chambers 732, 734 are made to be in fluid communication with each other. The airbag cushion 710 may further comprise one or more tethers 738. These one or more tethers 738 attach an outside portion of the first inflatable chamber 732 to an outside portion of the second inflatable chamber 734 and are designed to ensure that when inflated, the airbag cushion 710 forms and maintains the desired configuration.

The airbag cushion 710 is constructed such that when the airbag cushion 710 is inflated, the first inflatable chamber 732 intersects the second inflatable chamber 734 to form a first angle 737. The first angle 737 is constructed such that the first chamber 732 and the second chamber 734 are not coplanar. In the embodiment shown in FIG. 7, the first angle 737 is less than about 90°. However, other embodiments of the present invention may be made in which the measure of the first angle 737 is greater than about 90° or equal to about 90°.

In the airbag cushion 710 shown in FIG. 7, the inflatable chambers 732, 734 have been made such that when the airbag cushion 710 is inflated, the shape of the inflated airbag cushion 710 is generally V-shaped. Of course however, other embodiments may be made in which the shape, location, and orientation of the inflatable chambers 732, 734 are different than that which is depicted in FIG. 7.

The inflatable chambers 732, 734 are further designed to protect a vehicle occupant during a crash or accident. Specifically in the embodiment shown in FIG. 7, the first inflatable chamber 732 has been constructed to function as an inflatable impact chamber 721 that is capable of receiving the impact of a vehicle occupant during a crash. At the same time, the second inflatable chamber 734 has been made to function as one or more inflatable support columns 723 that are capable of providing compression resistance to the inflatable impact chamber 721. Of course however, other embodiments may be made in which the first inflatable chamber 732 functions as the one or more inflatable support columns 723 and the second inflatable chamber 734 functions as the inflatable impact chamber 721.

The airbag cushion 710 may also be made to include one or more uninflatable regions 754 and/or one or more chamber dividers 740. Even further, the airbag cushion 710 may be made to include an inflation port 727. An inflation port 727 is an inlet located on the airbag cushion 710 through which a volume of inflation gas may be introduced into the inflatable chambers 732, 734. Preferably, this inflation port 727 is made to be in fluid communication with the inflatable chambers 732, 734 as well as the inflator 712.

Referring now to FIG. 8, a different embodiment of an airbag cushion according to the present invention is depicted. Specifically, FIG. 8 shows the inflated configuration of inflating airbag cushion 810 that may be installed on a vehicle and is capable of functioning as a frontal airbag. The airbag cushion 810 is shown to be in fluid communication with an inflator 812. Connected to the inflator 812 is a sensor 814 that is capable of detecting and sensing a crash.

Unlike the previous embodiments described above, the airbag cushion 810 comprises multiple inflatable chambers. More specifically, the airbag cushion 810 comprises a first inflatable chamber 832, a second inflatable chamber 834, and one or more additional inflatable chambers 836.

In the embodiment shown in FIG. 8, two additional inflatable chambers 836 have been added to the airbag cushion 810 such that the airbag cushion 810 comprises four inflatable chambers. However, other embodiments may be made in which the airbag cushion 810 comprises more than two additional inflatable chambers 836. Similarly, yet further embodiments may be made in which the airbag cushion 810 comprises only one additional inflatable chamber 836.

The airbag cushion 810 is constructed such that the first inflatable chamber 832, the second inflatable chamber 834, and the one or more additional inflatable chambers 836 are in fluid communication with each other. Additionally, the inflatable chambers 832, 834, 836 may also be made to be in fluid communication with the inflator 812 through an inflation port 827.

As with the embodiments described above, one or more uninflatable regions 854 and/or one or more chamber dividers 840 may also be added to the airbag cushion 810. Specifically, these one or more uninflatable regions 854 and/or one or more chamber dividers 840 are added to the inflatable chambers 832, 834, 836 and operate to change the overall protective properties of the inflated airbag cushion 810.

The airbag cushion 810 may further comprise one or more tethers 838. These one or more tethers 838 attach an outside portion of one of the inflatable chambers 832, 834, 836 to an outside portion of one of the other inflatable chambers 832, 834, 836. The one or more tethers 838 may further be designed to ensure that upon inflation, the airbag cushion 810 forms and maintains the desired configuration.

In the airbag cushion 810, the inflatable chambers 832, 834, 836 have been made such that when the airbag cushion 810 is inflated, the inflatable chambers 832, 834, 836 form a generally polygonal shape. As the airbag cushion 810 shown in FIG. 8 has 4 sides, the shape of the airbag cushion 810 in the inflated configuration is that of a quadrilateral. However, as the number of the one or more additional chambers 836 may be different than that which is shown in FIG. 8, other embodiments may be constructed such that the airbag cushion 810 forms a different polygonal shape upon inflation. More specifically, the airbag cushion 810 may be configured such that if inflated, the airbag cushion 810 forms any regular or irregular polygonal shape including, but not limited to a rectangle, a triangle, a square, a pentagon, a hexagon, a heptagon, an octagon, a decagon, or the like.

The airbag cushion 810 is constructed such that when the airbag cushion 810 is inflated, the first inflatable chamber 832 intersects the second inflatable chamber 834 to form a first angle 837. The first angle 837 is constructed such that the first chamber 832 and the second chamber 834 are not coplanar. Moreover, the airbag cushion 810 has further been constructed such that the second inflatable chamber 834 intersects the one or more additional inflatable chambers 836 to form a second angle 839, the second angle 839 being configured such that the second inflatable chamber 834 and the one or more additional inflatable chambers 836 are not coplanar. Alternatively, the airbag cushion 810 may be constructed such that the first inflatable chamber 832 intersects the one or more additional inflatable chambers 836 to form a third angle 841, the third angle 841 being configured such that the first inflatable chamber 832 and the one or more additional inflatable chambers 836 are not coplanar.

In the embodiment shown in FIG. 8, the measure the first angle 837, the measure of the second angle 839, and the measure of the third angle 841 have been made to be less than about 90°. However, other embodiments may be made in which the measure the first angle 837, the measure of the second angle 839, and/or the measure of the third angle 841 is greater than or equal to about 90°.

Referring still to FIG. 8, the first inflatable chamber 832, the second inflatable chamber 834, and the one or more additional inflatable chambers 836 are designed to protect a vehicle occupant during a crash or accident. Specifically, the first inflatable chamber 832 has been constructed to function as an inflatable impact chamber 821 that is capable of receiving the impact of a vehicle occupant during a crash. At the same time, the second inflatable chamber 834 has been constructed to function as one or more inflatable support columns 823 that are capable of providing compression resistance to the inflatable impact chamber 821. One of the one or more additional inflatable chambers 836 may further be configured to comprise one or more second inflatable support columns 825 that also provide compression resistance to the inflatable impact chamber 821.

Of course, other embodiments may be made in which the second inflatable chamber 834 and/or the one or more additional inflatable chambers 836 are made to comprise the inflatable impact chamber 821. Yet other embodiments may be made in which the first inflatable chamber 832 comprises the one or more inflatable support columns 823. Still further embodiments may be made in which the first inflatable chamber 832 and/or the second inflatable chamber 834 comprise the one or more second inflatable support columns 825.

In summary, the present invention provides an airbag cushion that is lighter, smaller, and more compact than previously known airbag systems, yet still provides vehicle occupants with ample impact protection during a crash. Specifically, the present invention is a one-piece, woven airbag cushion that converts upon inflation into a three-dimensional structure that is generally triangular in shape. This generally triangular structure has an inflatable impact chamber designed to receive the impact of the occupant. The airbag also includes one or more inflatable support columns that increase the structural integrity of the inflatable impact chamber by providing compression resistance to the inflatable impact chamber.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. An inflatable airbag cushion comprising:
   a first inflatable chamber;
   a second inflatable chamber;
   a third inflatable chamber, the first, second and third inflatable chambers being in fluid communication with each other;
   at least one tether attaching an outside portion of one of the inflatable chambers to an outside portion of a different inflatable chamber such that if the airbag cushion is inflated, the first, second, and third inflatable chambers form a generally triangular shape;
   wherein one of the inflatable chambers functions as an inflatable impact chamber that is capable of receiving the impact of a vehicle occupant during a crash and one of the remaining inflatable chambers functions as one or more inflatable support columns capable of providing compression resistance to the inflatable impact chamber.

2. The airbag cushion of claim 1 further comprising one or more uninflatable regions.

3. The airbag cushion of claim 1 further comprising one or more chamber dividers.

4. The airbag cushion of claim 1 further comprising an inflation port in fluid communication with the airbag cushion.

5. The airbag cushion of claim 1 wherein one or more of the inflatable chambers comprises a body.

6. The airbag cushion of claim 1 wherein one or more of the inflatable chambers comprises a neck.

7. The airbag cushion of claim 1 wherein one or more of the inflatable chambers comprises a cutout.

8. The airbag cushion of claim 1 wherein one or more of the inflatable chambers comprises extending arms.

9. The inflatable airbag cushion of claim 1, wherein if the airbag cushion is inflated, the first and second inflatable chambers intersect to form a first angle, the second and third inflatable chambers intersect to form a second angle, and the first and third inflatable chambers intersect to form a third angle.

10. The inflatable airbag cushion of claim 9 wherein the measure of the first angle is less than about 80°.

11. The inflatable airbag cushion of claim 9 wherein the measure of the second angle is less than about 80°.

12. The inflatable airbag cushion of claim 9 wherein the measure of the third angle is less than about 80°.

13. The inflatable airbag cushion of claim 9 wherein the sum of the measures of the first, second, and third angles equals about 180°.

14. The inflatable airbag cushion of claim 9 wherein the measures of the first, second, and third angles are substantially equal.

15. The airbag cushion as in claim 1 wherein the first inflatable chamber functions as the inflatable impact chamber.

16. The airbag cushion as in claim 15 wherein the third inflatable chamber functions as an inflatable support column.

17. The airbag cushion as in claim 1 wherein the third inflatable chamber functions as the inflatable impact chamber.

18. The airbag cushion as in claim 17 wherein the first inflatable chamber functions as an inflatable support column.

19. The airbag cushion as in claim 1 wherein the second inflatable chamber functions as the inflatable impact chamber.

20. The airbag cushion as in claim 19 wherein the third inflatable chamber functions as an inflatable support column.

21. The airbag cushion as in claim 1 wherein one of the inflatable chambers is constructed to function as one or more second inflatable support columns.

22. The airbag cushion as in claim 1 wherein one of the inflatable chambers comprises a neck.

23. The airbag cushion as in claim 1 wherein the airbag cushion functions as a frontal airbag.

24. The airbag cushion as in claim 1 wherein the airbag cushion functions as an overhead airbag.

25. An inflatable airbag cushion comprising:
    a first inflatable chamber;
    a second inflatable chamber;
    a third inflatable chamber, the first, second and third inflatable chambers being in fluid communication with each other, the airbag cushion constructed such that when inflated, the first chamber intersects the second chamber to form a first angle, the second and third inflatable chambers intersect to form a second angle, and the first and third inflatable chambers intersect to form a third angle; and
    at least one tether attaching an outside portion of one of the inflatable chambers to an outside portion of a different inflatable chamber such that if the airbag cushion is inflated, the first, second, and third inflatable chambers form a generally triangular shape, wherein one of the inflatable chambers functions as an inflatable impact chamber that is capable of receiving the impact of a vehicle occupant during a crash and one of the remaining inflatable chambers functions as one or more inflatable support columns capable of providing compression resistance to the inflatable impact chamber.

26. The inflatable airbag cushion of claim 25 wherein the measure of the first angle is less than about 80°.

27. The inflatable airbag cushion of claim 25 wherein the measure of the second angle is less than about 80°.

28. The inflatable airbag cushion of claim 25 wherein the measure of the third angle is less than about 80°.

29. The inflatable airbag cushion of claim 25 wherein the sum of the measures of the first, second, and third angles equals about 180°.

30. The inflatable airbag cushion of claim 25 wherein the measures of the first, second, and third angles are substantially equal.

31. The airbag cushion as in claim 25 further comprising an inflation port in fluid communication with the airbag cushion.

32. The airbag cushion as in claim 25 wherein one of the inflatable chambers comprises a neck.

33. The airbag cushion as in claim 25 wherein one or more of the inflatable chambers comprises a body.

34. The airbag cushion as in claim 25 wherein one or more of the inflatable chambers comprises a cutout.

35. The airbag cushion as in claim 25 wherein the airbag cushion functions as a frontal airbag.

36. The airbag cushion as in claim 25 wherein the airbag cushion functions as an overhead airbag.

37. An inflatable airbag cushion comprising:
- an inflatable impact chamber that is capable of receiving the impact of a vehicle occupant during a crash;
- an inflatable support column capable of providing compression resistance to the inflatable impact chamber;
- a second inflatable support column capable of providing compression resistance to the inflatable impact chamber; and
- at least one tether attached to the airbag cushion such that if the airbag cushion is inflated, the inflatable impact chamber, the inflatable support column, and the second inflatable support column form a generally triangular shape.

38. The inflatable airbag cushion of claim 37 wherein the second inflatable support column comprises a neck adjacent to a first end and a body adjacent to a second end.

39. The inflatable airbag cushion of claim 37 further comprising an inflation port.

40. The inflatable airbag cushion of claim 37 wherein the airbag cushion functions as a frontal airbag.

41. The inflatable airbag cushion of claim 37 wherein the airbag cushion functions as an overhead airbag.

42. The inflatable airbag cushion of claim 37 wherein one or more of the inflatable chamber and the inflatable columns comprises a neck.

43. The inflatable airbag cushion of claim 37 wherein one or more of the inflatable chamber and the inflatable columns comprises a body.

44. The inflatable airbag cushion of claim 37 wherein one or more of the inflatable chamber and the inflatable columns comprises a cutout.

* * * * *

UNITED STATES PATENT AND TRADEMARK OFFICE
CERTIFICATE OF CORRECTION

| | | |
|---|---|---|
| PATENT NO. | : 7,025,376 B2 | Page 1 of 1 |
| APPLICATION NO. | : 10/379452 | |
| DATED | : April 11, 2006 | |
| INVENTOR(S) | : David L. Dominssini | |

It is certified that error appears in the above-identified patent and that said Letters Patent is hereby corrected as shown below:

column 7, line 27; please replace "which" with --with-- column 7, line 33; please delete "110" from the phrase "generally 110 triangular"

column 8, line 3; please replace "34 36" with --34, 36-- column 11 after line 26, please insert the paragraph beginning at line 10 on page 23 of the application which reads:

--Similarly, the airbag cushion 410 may also be formed such that when the airbag cushion 410 is inflated, the second inflatable chamber 434 intersects the third inflatable chamber 436 to form a second angle 439. It is also preferable for the second angle 439 to be set such that in the inflated configuration, the measure of the second angle 439 is less than about 80°.--

Signed and Sealed this

Nineteenth Day of September, 2006

JON W. DUDAS
*Director of the United States Patent and Trademark Office*